(No Model.) 2 Sheets—Sheet 1.

G. H. SELLERS.
APPARATUS FOR PURIFYING WATER.

No. 564,941. Patented July 28, 1896.

Witnesses. Inventor.

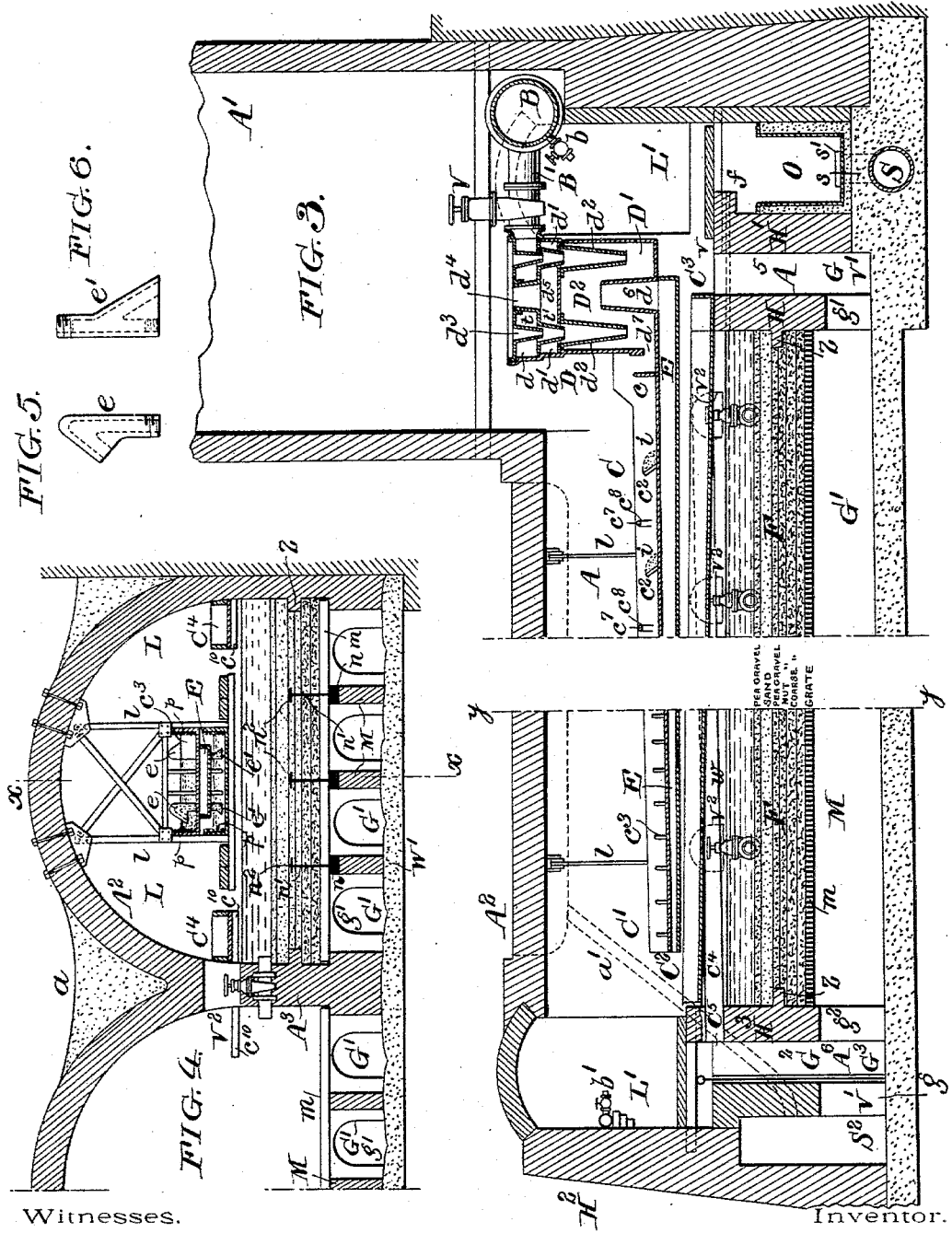

UNITED STATES PATENT OFFICE.

GEORGE H. SELLERS, OF WILMINGTON, DELAWARE.

APPARATUS FOR PURIFYING WATER.

SPECIFICATION forming part of Letters Patent No. 564,941, dated July 28, 1896.

Original application filed May 29, 1893, Serial No. 475,843. Divided and this application filed September 16, 1895. Serial No. 562,630. (No model.)

*To all whom it may concern:*

Be it known that I, GEORGE H. SELLERS, a citizen of the United States, residing at Wilmington, in the county of New Castle, in the State of Delaware, have invented a certain new and useful Improvement in Apparatus for Purifying Water, of which the following specification is a true and exact description, reference being had to the accompanying drawings, which form a part of the specification.

This case is a division of my application filed May 29, 1893, Serial No. 475,843.

My invention relates to apparatus for purifying water, and is especially adapted to be used in connection with extensive works for cities or other places where a large and continuous supply of pure water is needed.

It has been found that water stored in iron or other tanks where a piece of iron is suspended therein was improved in quality, which improvement, it was discovered, was due to the formation of a precipitate of ferric hydroxid, which tended to oxidize, coagulate, and destroy the animal and vegetable impurities in most waters. This oxidation and coagulation of the animal and vegetable impurities is hastened by aeration.

The main object of my invention is to provide a practical apparatus for removing the impurities from water in the manner broadly outlined above, and to so arrange it that it can be easily cleaned when required, and that it will continuously deliver an abundant supply of sterile water.

My invention is best described in connection with the drawings in which it is illustrated, and in which—

Figure 1:
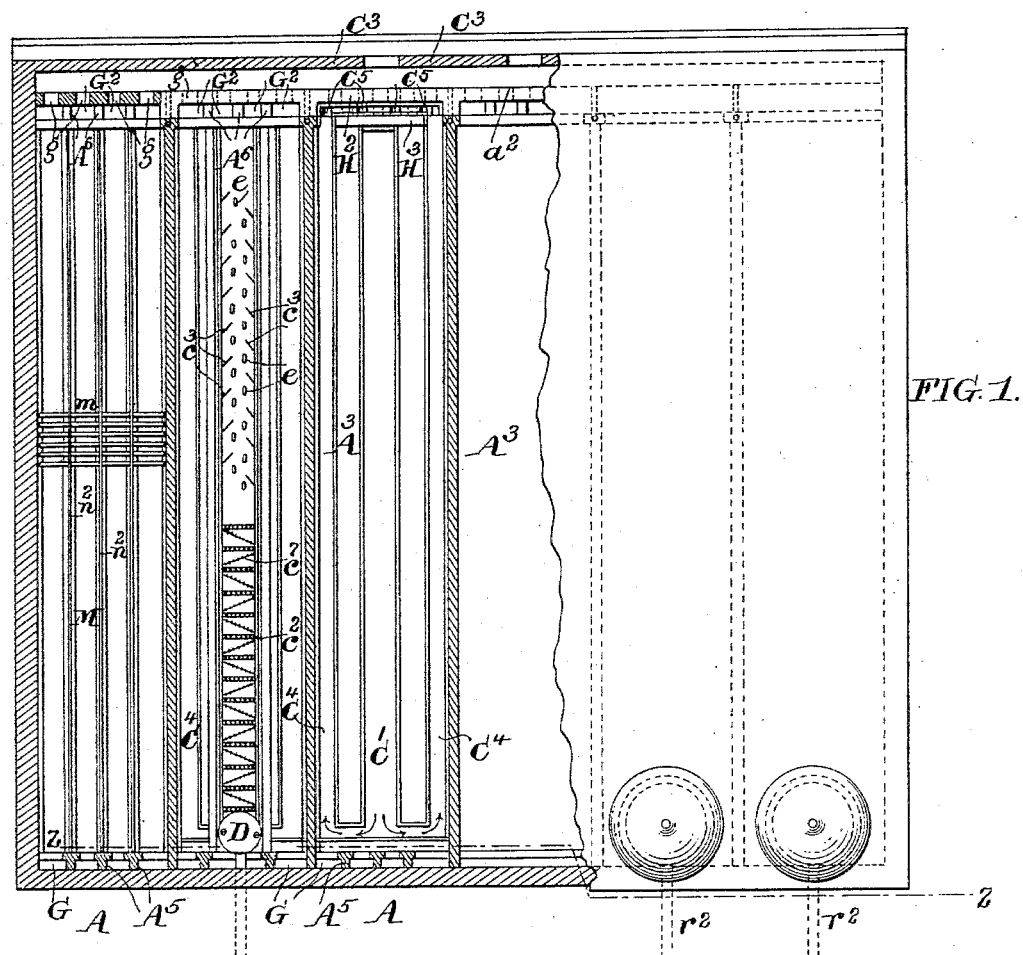
Figure 2:
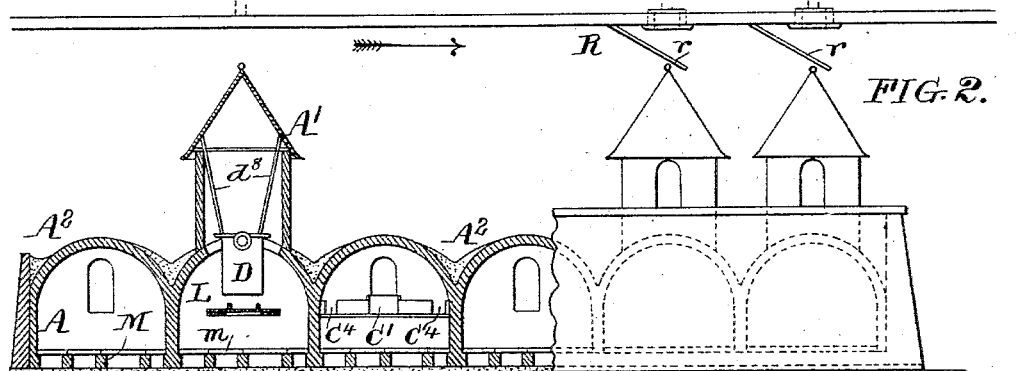

Figure 1 is a plan view, partly in section, of a water-purifying plant constructed according to my invention. Fig. 2 is a sectional view on the line $z\ z$ of Fig. 1. Fig. 3 is a longitudinal section on the line $x\ x$ of Fig. 4, showing one of the filtering-sections and the mode of introducing the water. Fig. 4 is a cross-section on the line $y\ y$ of Fig. 3, showing a section of the water-conduit and the air-passages. Figs. 5 and 6 are detail views of the air-passages leading to the upper and lower water-conduits.

A represents a complete filtering apparatus, which may be duplicated as often as may be necessary to complete the plant, as shown in Fig. 1.

$A^2$ are brick or stone arches built preferably below the surface of the water to be filtered, so that it may flow into the apparatus by gravity and accessible through the small tower or towers $A'$.

The water to be purified may be taken into the apparatus through pipes, as $r^2$, from a race or stream, as R, and is conducted through a main, as B, and distributing inlet-pipes $B'$ to each filtering apparatus. The water on leaving an inlet-pipe $B'$ passes through conduits C $C^2$, where it flows through scrap-iron and is aerated, and then through conduits $C^4$ and passage $G^2$, down under a filter, as F, through the filter, where all impurities are removed, and finally out through the outlet-pipe $f$ to the clear-water main O.

The air to aerate the water may of course be taken from any convenient supply of compressed air, but I prefer to compress the air by the action of the water itself as it flows from the pipe $B'$ to the conduit C.

Any convenient pump can be operated by the water to compress the air, but I prefer to use an injector-pump operated by the flow or fall of the water. A convenient form of such pump is illustrated at D, which consists, as shown, of a cylindrical chest, preferably of cast-iron, divided into three compartments $d$, $d^5$, and $D'$ by partitions, as $t\ t'$. This pump D may be conveniently supported by straps, as $d^8$. The water flows from the pipe B into the upper compartment $d$ and flows downward through nozzles $d'$ and $d^2$ into the chamber $D'$. Air is drawn in by the falling water through nozzles $d^3$ from the outer air and from the compartment $d^5$, which is open to the air at $d^4$, through the annular openings between the nozzles $d'$ and $d^2$. The air and water flow into the compartment $D'$, whence the water already considerably aerated by the air which it has drawn in through the nozzles $d^3\ d^4$, &c., flows through the opening $d^7$ and over the baffle $c$, which serves to make a water seal over the opening $d^7$ into the conduit C.

The air, somewhat compressed, escapes by the nozzle $d^6$ into the air-reservoir E, which may be conveniently arranged between the conduits C and C², from whence it is conducted through nozzles, as shown at $e\ e'$, into the water flowing in the conduits C and C². These nozzles may of course be of any suitable form, the forms shown in Figs. 5 and 6 being, however, very convenient for this purpose. In the conduit C, I place racks or cradles $c^2$, preferably formed of a series of fingers, and place against them scrap-iron, preferably in the shape of punchings, as at $i$. Any desired number of these racks may be arranged as shown in Fig. 1, and across the conduit, between the racks, bars, as $c^7$, may be laid, on which iron bars, or horseshoes, or other scrap-iron $c^8$ may be hung, so as to extend into the water-current. These bars are laid obliquely across the conduit, so that the water-current will agitate the iron bars or other scrap hung thereon and prevent their rusting together. The racks $c^2$ are also arranged so that an attendant can conveniently stir the punchings at intervals to prevent the punchings or other scrap-iron rusting together and so impeding the flow of the water.

In the conduit C, below the racks, are placed riffle or crisscross bars $C^3$, preferably arranged so as to throw the stream of water from one side to the other of the conduit and to cause all the water to flow around the nozzles $e\ e'$ for aeration. The same construction may be duplicated in the conduit C². By causing the water to flow through iron scrap the oxidation of the iron forms ferric hydroxid, as explained, and the small particles of rust carried away and held in suspension by the water attach themselves to and coagulate the impurities in the water and precipitate them in such form that they are prevented from passing through the filtering apparatus, and this oxidizing or rusting of the iron is facilitated by the aeration of the water, which also serves to render the water fresh and palatable as it issues from the filter. The water being aerated in the conduit C', flows into the second conduit C², where it is further aerated and a more complete gathering of the impurities takes place. The water flows from the conduit C², by the mouth C³, into channels C⁴, which are situated, as shown, on each side of the channel C'. The channels C⁴ are not much inclined, so that the water will flow slowly and there will be sufficient time for the coagulation to be formed.

Passing now to the filtering mechanism shown in the drawings, and which forms the subject-matter of my application filed March 29, 1893, Serial No. 475,843, of which case this application is a division, the water empties from the conduit C⁴, through outlets C⁵, into the wells G². These wells G² are formed by the walls H² H³ on two sides and by walls A⁶ or the partition-walls A³ of the different sections on the other two sides. There are just as many of these walls as there are divisions of the filter, the partition-walls A³ being continuations of these walls M, on the other side of the wall H³, from the walls M, and these partition-walls A³ extend up higher than the level of the water in the filter F. The object of these partition-walls A³ and M is to divide each filter into a number of divisions for convenience in cleaning, as will be explained. From the wells G² open passages $g^2$ to the space G' beneath the filter, the walls M, built on the concrete floor W', serving to support cross-slats, as $m$, which may be of wood, on which is laid a filtering-bed. This filtering-bed may be made of any convenient filtering material; but I prefer to use gravel in layers which increase in fineness from the bottom to the top, as by forming the lower layer of coarse gravel, and so on, as indicated in Fig. 3, till fine sand is reached, a layer of coarser gravel may be laid on the sand to prevent its displacement under the ascending currents of water. After the water has risen through the filter and been cleaned of its impurities it flows through the conduit $f$ into the clear-water main O, a drain-pipe S being arranged below the main O for purposes of cleaning and being connected thereto by means of passages $s$ and gates $s'$.

For convenience in cleaning, wells similar to the wells G², formed by side walls A³ and partition-walls A⁵, similar to walls A⁶ on two sides and the walls H H' on the other two sides, are arranged at the other end of the apparatus from said wells G² and opens into the space G' by means of openings $g'$, similar to the arches $g^2$. When it is desired to clean the filter, the supply of impure water is shut off by closing the valve V, and the valves V' in the bottoms G³ of the wells G² are opened. This permits the water in the apparatus to flow through passages $g$ to the waste-main S². The pure water at $w$ above the filter-bed also flows back through the filter by gravity and in so flowing carries the impurities lodged therein down and away to the waste-main S². If there should be insufficient water above the particular filter that it is desired to clean to properly carry away the collected impurities, a greater quantity of clean water may be obtained by opening valves V², communicating with other sections of the apparatus. Water may also be introduced into the wells and passages G G² G' by means of suitable hose connected with the water supply at $b\ b'$ and any slime washed away.

If it is desired to cleanse any one division of the filter, the particular valve V' which governs its outlet $g$ can be opened and water will not only flow from above back through said filter-bed, as described, but the incoming water from the other divisions of the filter will flow out through the open passage and aid in effectually cleaning out the opened division, and this water from the other divisions comes to the surface of the open division sidewise rather than vertically as the water above the filter-bed comes, and so exfectually washes away any impurities on the surface which would not be removed by the use of the water from above the filter-bed. To compel the water in any division to become partially filtered before being used to clear another division, I prefer to arrange the filter-bed as shown in Fig. 4, where $n\ n$ are blocks of wood laid on the walls M, and $n'$ are upright board walls secured to the blocks $n$ and extending a short distance into the filter-bed, so that water from any one division will have to flow over these walls $n'$ to get to the next division.

The conduits C $C^2$ may be conveniently supported by brackets, as $l$, hung from the top of the arches $A^2$, and planks may conveniently be arranged at L for footways for the workmen, and to support the conduit $C^4$ bars, as $c^{10}$, may be arranged in the walls $A^3$, projecting from each side in the manner shown.

L' L' are suitable doorways communicating from one filter-section to the next. The arches may be filled at $a$ with cement to prevent surface water from leaking into the space beneath, and a drain-pipe, as $a'$, leading to the waste-main $S^2$, may be provided to guard against any accumulation of water between the masonry-arches.

A grid or deflector, as shown at $r$, may be used to prevent leaves or large impurities in the race from entering the filtering-chambers.

The conduits C are very conveniently made of cast-iron, and to prevent wear or rusting they are preferably covered on their inside to a short distance above the water-line with cement, as shown at $p$. The wells G $G^2$ may also be lined with cement, as may any other part of the apparatus when its use is desirable.

In practice it has been found that the water as it rises through the filter will carry away the sand and other filtering material which lies next to the walls of the filter and thus make a passage for itself between the filter-walls and the filtering-bed, through which it can pass unfiltered. To prevent this, I place an obstruction to the flow of the water all around the walls of the filter. This obstruction may be made of wood or any other proper material, but I prefer to make it by a projection from the brick walls themselves, as shown at Z, Figs. 3 and 4. This causes the water to pass inward into the body of the filter-bed and prevents any unfiltered water from escaping through the filter; and I also arrange a projecting piece $n^2$ on the top of the wall $n'$ for the same purpose.

In the drawings I have shown what I consider the best plan of my apparatus, but it is evident that numerous changes can be made in the arrangement of the parts without departing from the spirit of my invention, and I do not desire to be considered as limiting myself to the precise construction shown.

Having now described my invention, what I claim as new, and desire to secure by Letters Patent, is—

1. In an apparatus for purifying water the combination of a water-inlet, conduits C $C^2$ leading from the inlet, an air-pump between the water-inlet and conduits for compressing air, an air-reservoir situated between the conduits C $C^2$ and nozzles $e\ e'$ leading from the air-reservoir and adapted to discharge air beneath the surface of the water in said conduits.

2. In an apparatus for purifying water the combination of a water-inlet a conduit for water as C leading therefrom, a chest D arranged to conduct the water from the inlet to the conduit C having partitions as $t\ t'$ and nozzles as $d'\ d^2\ d^3$ for the passage of water and air.

3. In an apparatus for purifying water the combination with an inlet B' for water, a chest D having a compartment $d$ into which the water flows from the inlet-pipe B', nozzles $d'\ d^2$ for the water and nozzles $d$ for air, outlets $d^6\ d^7$ for air and water respectively and an air-reservoir E.

4. In an apparatus for purifying water the combination with a water-conduit C leading to a filter, of retarding-bars $c^2$, iron scrap supported thereby through which the water is adapted to flow, means for aerating the water after it passes the iron scrap and before it reaches the filter and crisscross-bars $c^3$ situated in conduit C substantially as and for the purpose specified.

5. In an apparatus for purifying water, the combination with a water-conduit of a series of racks or cradles in said conduit, iron scrap supported by said racks, a series of aerating-nozzles in the conduit below the racks and riffle-bars to direct the water-current across the line of aerating-nozzles.

6. In an apparatus for purifying water, the combination with a water-conduit, of a series of open racks or cradles in said conduit, iron scrap supported by said open racks in a manner so as to be easily stirred when necessary, a series of aerating-nozzles in the conduit below the racks and riffle-bars to direct the water-conduit across the line of aerating-nozzles.

GEO. H. SELLERS.

Witnesses:
A. H. FABER,
H. J. PACK.